No. 889,045. PATENTED MAY 26, 1908.
W. H. RODDEN & C. E. GRAY.
CATTLE STANCHION.
APPLICATION FILED NOV. 16, 1907.
2 SHEETS—SHEET 1.
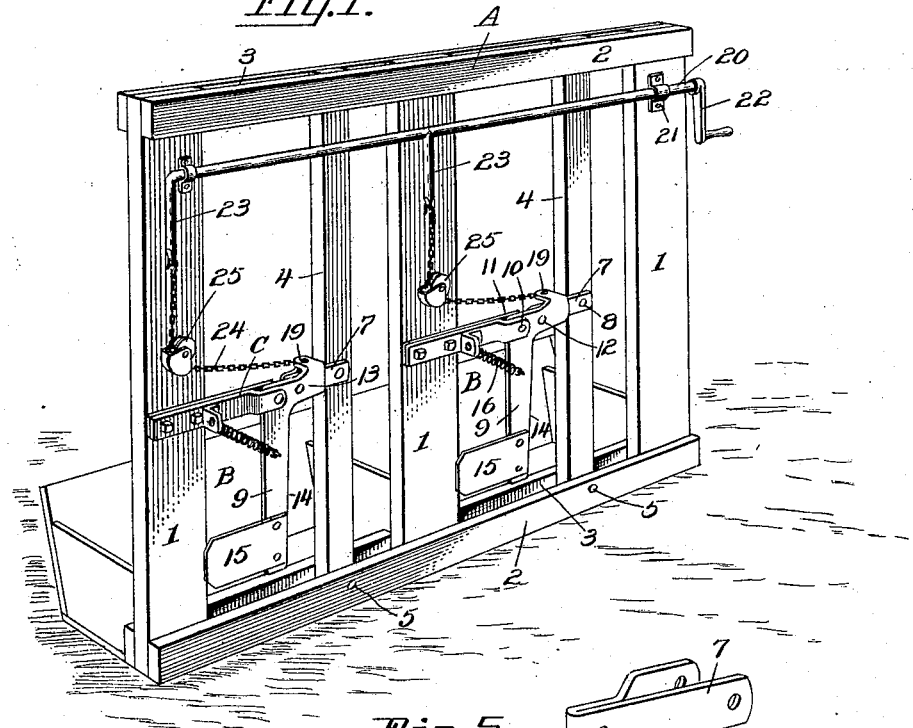
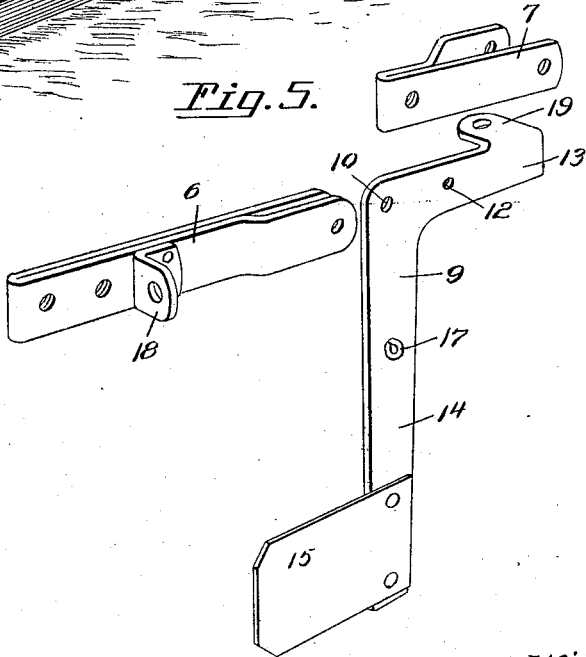
Witnesses
F. C. Gibson.
C. Bradway
Inventors
William H. Rodden.
Charles E. Gray.
By Victor J. Evans
Attorney No. 889,045. PATENTED MAY 26, 1908.
W. H. RODDEN & C. E. GRAY.
CATTLE STANCHION.
APPLICATION FILED NOV. 16, 1907.

2 SHEETS—SHEET 2.

Witnesses
F. C. Gilson.
C. Bradway.

Inventors
William H. Rodden.
Charles E. Gray.
By Victor J. Evans
Attorney

UNITED STATES PATENT OFFICE.

WILLIAM H. RODDEN, OF ELIZABETH, AND CHARLES E. GRAY, OF HANOVER, ILLINOIS.

CATTLE-STANCHION.

No. 889,045.　　　Specification of Letters Patent.　　　Patented May 26, 1908.

Application filed November 16, 1907. Serial No. 402,521.

*To all whom it may concern:*

Be it known that we, WILLIAM H. RODDEN and CHARLES E. GRAY, citizens of the United States, residing at Elizabeth and Hanover, respectively, in the county of Jo Daviess and State of Illinois, have invented new and useful Improvements in Cattle-Stanchions, of which the following is a specification.

This invention relates to cattle stanchions adapted primarily for use on dairy farms, and it relates more particularly to cattle stanchions of that type in which the stanchion bars can be simultaneously moved to open position from one point.

The invention has for one of its objects to improve and simplify the construction and operation of devices of this character so as to be comparatively easy and inexpensive to manufacture and thoroughly reliable and convenient in use.

A further object of the invention is the provision of a mechanism whereby each cow upon entering its stall and passing its head between the stanchion bar will automatically release the movable stanchion bar and cause the latter to move to locking position.

Another object of the invention is the employment of a locking device for the movable stanchion bars, which locking devices are automatically set by the means for throwing the said stanchion bar to open position when the cattle are released.

With these and other objects in view, and others as will appear as the description proceeds, the invention comprises the various novel features of construction and arrangement of parts which will be more fully described hereinafter, and set forth with particularity in the claims appended hereto.

Figure 2:
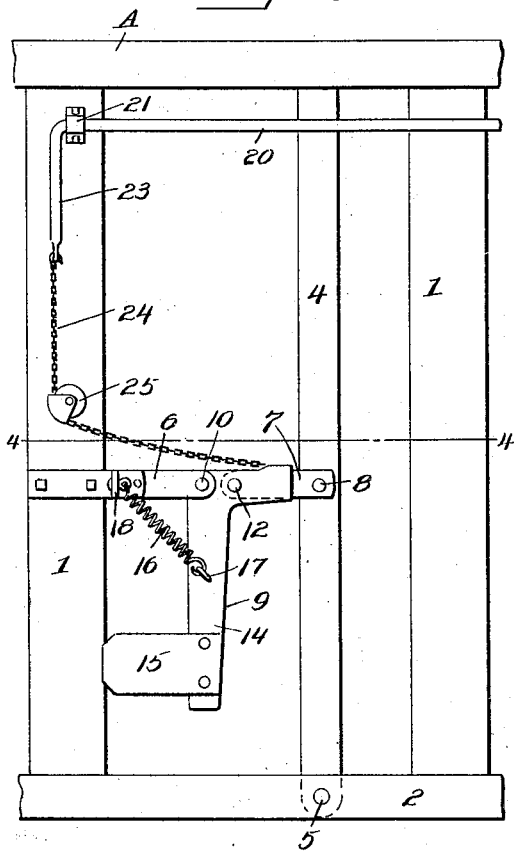
Figure 3:
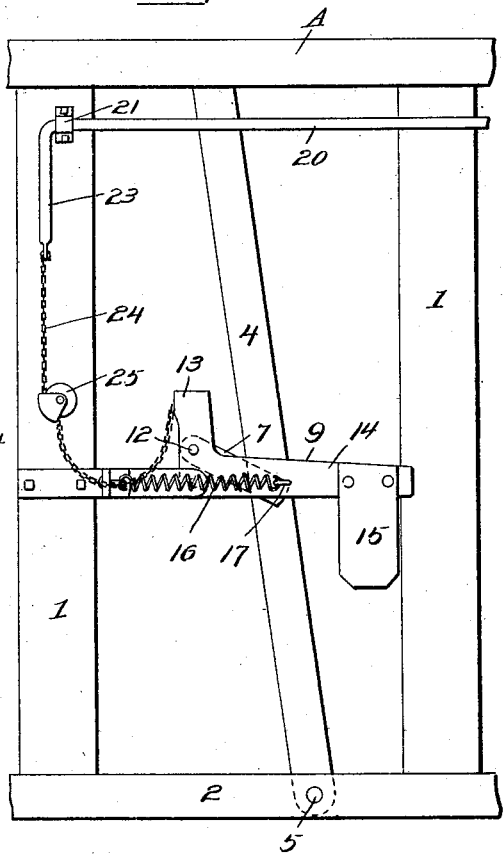
Figure 4:
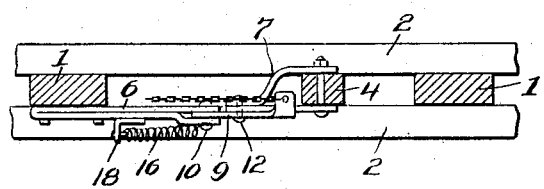

In the accompanying drawings, which illustrate one of the embodiments of the invention,—Figure 1 is a perspective view of a stanchion frame with our improved mechanism applied thereto. Figs. 2 and 3 are front elevations showing the movable stanchion bar in locked and unlocked position. Fig. 4 is a horizontal section on line 4—4 of Fig. 2. Fig. 5 is a perspective view of a locking device showing the parts disassociated.

Similar reference characters are employed to designate corresponding parts throughout the several views.

Referring to the drawings, A designates the stanchion frame which may be of any desired length so as to provide accommodations for one or more cows, and at the base of the frame are the mangers B. The frame A consists of fixed uprights 1 forming stanchion bars and horizontal beams 2 connected with the upper and lower ends of the uprights, the beams being spaced apart on opposite sides of the uprights to form pockets 3 into which the ends of the movable stanchion bars 4 extend. The lower ends of the stanchion bars 4 are connected with the lower beams 2 by pivots 5 and at such a distance from the adjacent fixed stanchion bars or uprights 1 to accommodate the neck of a cow, the upper ends of the movable stanchion bars being guided between the spaced upper beams 2.

Each stanchion bar 4 is adapted to be locked in position by a device C that is capable of being automatically released by the cow when passing its head between the stanchion bars to reach the food in the manger. Each locking device consists of an arm 6 secured to an upright 1, an arm 7 pivotally connected at 8 to the movable stanchion bar, and a lever or locking member 9 which is pivoted at 10 between the bifurcations 11 of the arm 6 and pivoted also at 12 to the outer end of the arm 7. The member 9 is in the form of a bell crank lever whose arm 13 coöperates with the member 7 to form a pair of toggle links between the fixed arm 6 and the movable stanchion bar 4. When the toggle links are straightened, the movable stanchion bar is held in locked position as the pivots 8, 10 and 12 lie in a common straight line. The long arm 14 of the member 9 is provided with a guard 15 which, when the member is in the position shown in Fig. 3, prevents the cow from inserting its head between the stanchion bars at a point below the member 9, thus insuring the neck of the cow striking the member at the top and forcing it downwardly on its pivot 10. This initial movement of the member produced by the cow throws a spring into operation, whereby the movement of the member is completed and the toggle links straightened so that the movable stanchion bar will be locked in position. For this purpose, a helical extension spring 16 is connected with an eye 17. This spring is connected with an eye 17 on the long arm 14 and with a bracket 18 on the fixed member 6, and when the locking device is in set position, as shown in Fig. 3, the spring will be expanded, and the spring will have no tendency to move in one direction or the other. To limit the movement of the member 9 under the action of the spring 16 the short arm 13 is provided with a laterally extending projection or stop 19 that engages the top of the link 7 so that the toggle links will not be collapsed in a manner to return the movable stanchion bar when the latter has been thrown to locking position.

To set the toggle devices simultaneously and at the same time unlock the stanchion bars so as to release the cattle a rock shaft 20 is mounted on the frame A in bearings 21, the shaft having an operating crank 22 at one end. On the shaft 20 are crank arms 23 that are connected by flexible elements or chains 24 with the lugs 19 of the trigger or locking members 9, each chain passing over a guide pulley 25 suitably mounted on the stanchion frame.

In practice, the crank shaft 23 is thrown upwardly so as to collapse the toggle links of the locking devices and thereby swing the movable stanchion bars to open position for releasing the cows, and simultaneously with this movement the members 9 are thrown from the position shown in Fig. 2 to that shown in Fig. 3, the spring 16 being expanded at the same time so as to automatically lock the stanchion bars as soon as the cows release the members 9. When the cows are returned to the stable and driven into their stalls, they naturally pass their heads between the fixed and movable stanchions to reach the mangers B, and in doing this their necks come into contact with the members 9 or triggers and cause the same to move downwardly, thereby throwing the springs 16 off their dead centers, so that the contractile movement of the latter will throw the stanchion bars 4 to locking position, the crank shaft being automatically returned to normal position by the springs.

It will thus be seen that the device is comparatively easy and convenient to manipulate, and the cows can automatically lock themselves in their stalls, the only necessary manual operation being the unlocking of the stanchion bars.

From the foregoing description, taken in connection with the accompanying drawings, the advantages of the construction and the method of operation will be readily apparent to those skilled in the art to which the invention appertains, and while we have described the principle of operation of the invention, together with the apparatus which we now consider to be the best embodiment thereof, we desire to have it understood that the apparatus shown is merely illustrative, and that such changes may be made when desired as are within the scope of the claims.

Having thus described the invention, what is claimed as new, is:—

1. The combination of a stanchion frame including a movable stanchion bar, toggle links connected with the bar, a member connected with one of the links and arranged to be tripped by an animal entering the stanchion, means arranged to operate through the links to throw the stanchion bar to locked position when the member is tripped, and a device connected with one of the links for returning the parts to set position and to unlock the stanchion bar.

2. The combination of a stanchion device including a movable stanchion bar, with a pair of toggle links, a member connected with one of the links and forming a trip, a spring connected with the trip and arranged to be held under tension when the trip is in set position, and a manually actuated device connected with the links for throwing the trip into set position.

3. The combination of a stanchion device including a movable stanchion bar, toggle links connected with the bar, a member on one of the links adapted to be set into motion by the animal entering the stanchion, means controlled by the movement of the member for straightening the links and throwing the bar into locked position, and manual means for collapsing the links and simultaneously moving the member to set position and unlocking the stanchion bar.

4. The combination with a stanchion device including a movable bar, a pair of toggle links connected with the bar, one link being in the form of a bell crank lever having one arm adapted to move across the bar so as to be struck by the animal entering the stanchion, a spring tending to hold the stanchion bar in locked position, and manual means operated from a remote point for unlocking the stanchion bar and returning the parts to set position.

5. In a device of the class described, the combination of a frame, a stanchion bar, a pair of toggle links, one of which is pivotally mounted on the bar, a member to which the other link is pivotally connected, an arm on one of the links, a guard on said arm, a spring fixed at one end and connected at its other end with the arm and adapted to be expanded when the toggle links are collapsed, a stop on one of the links adapted to engage the other for stopping the movement of the links when the stanchion bar is fully thrown to closed position, a crank shaft mounted on the frame, a flexible element between the shaft and one of the links for moving the stanchion bar to open position, and a guiding means on the frame for the flexible element.

6. The combination of a stanchion device including a movable bar, a device for locking the bar and adapted to be actuated by the animal entering the stanchion device, and manual means for unlocking the stanchion bar, said means including a rock shaft, and a flexible element between the shaft and the locking device.

In testimony whereof we affix our signatures in presence of two witnesses.

WILLIAM H. RODDEN.

Witnesses:
  A. J. MILLHOUSE,
  HARRY A. BASTIAN.

CHARLES E. GRAY.

Witnesses:
  A. J. MILLHOUSE,
  HARRY A. BASTIAN.